US007030055B2

(12) United States Patent
Yaluris et al.

(10) Patent No.: US 7,030,055 B2
(45) Date of Patent: *Apr. 18, 2006

(54) NO$_x$ REDUCTION COMPOSITIONS FOR USE IN FCC PROCESSES

(75) Inventors: George Yaluris, Columbia, MD (US); John Allen Rudesill, Columbia, MD (US)

(73) Assignee: W.R. Grace & Co.-Conn., Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/837,846

(22) Filed: May 3, 2004

(65) Prior Publication Data

US 2005/0042158 A1 Feb. 24, 2005

Related U.S. Application Data

(63) Continuation of application No. 10/642,924, filed on Aug. 18, 2003, now Pat. No. 6,881,390.

(51) Int. Cl.
*B01J 23/00* (2006.01)
*B01J 23/40* (2006.01)
*B01J 23/42* (2006.01)
*B01J 23/44* (2006.01)
*B01J 21/00* (2006.01)

(52) U.S. Cl. .................. 502/326; 502/241; 502/242; 502/243; 502/244; 502/245; 502/247; 502/250; 502/251; 502/252; 502/257; 502/261; 502/262; 502/263; 502/302; 502/303; 502/304; 502/309; 502/312; 502/314; 502/318; 502/327; 502/328; 502/330; 502/331; 502/334; 502/339; 502/415; 502/439; 502/333

(58) Field of Classification Search .............. 502/241, 502/242, 243, 244, 245, 247, 250–252, 257, 502/261–263, 302–304, 309, 312, 314, 318, 502/326–328, 330–331, 333, 334, 339, 415, 502/439
See application file for complete search history.

(56) References Cited

U.S. PATENT DOCUMENTS 3,700,745 A * 10/1972 Kovach et al. ............. 585/485
4,151,121 A *  4/1979 Gladrow .................... 502/65
4,171,287 A * 10/1979 Keith ....................... 502/304

(Continued)

Primary Examiner—Cam N. Nguyen
(74) Attorney, Agent, or Firm—Beverly J. Artale; Chuck A. Cross

(57) ABSTRACT

Compositions for reduction of gas phase reduced nitrogen species and NO$_x$ generated during a partial or incomplete combustion catalytic cracking process, preferably, a fluid catalytic cracking process, are disclosed. The compositions comprise (i) an acidic metal oxide containing substantially no zeolite, (ii) an alkali metal, alkaline earth metal, and mixtures thereof, (iii) an oxygen storage component, and (iv) a noble metal component, preferably rhodium or iridium, and mixtures thereof, are disclosed. Preferably, the compositions are used as separate additives particles circulated along with the circulating FCC catalyst inventory. Reduced emissions of gas phase reduced nitrogen species and NO$_x$ in an effluent off gas of a partial or incomplete combustion FCC regenerator provide for an overall NO$_x$ reduction as the effluent gas stream is passed from the FCC regenerator to a CO boiler, whereby as CO is oxidized to CO$_2$ a lesser amount of the reduced nitrogen species is oxidized to NO$_x$.

27 Claims, 5 Drawing Sheets

U.S. PATENT DOCUMENTS

| | | | |
|---|---|---|---|
| 4,212,771 A * | 7/1980 | Hamner | 502/64 |
| 4,285,806 A * | 8/1981 | Mooi | 208/120.1 |
| 4,290,878 A | 9/1981 | Blanton, Jr. | 208/120 |
| 4,368,057 A | 1/1983 | Matthews | 47/197 |
| 4,427,536 A | 1/1984 | Klaassen et al. | 208/113 |
| 4,434,147 A | 2/1984 | Dimpfl et al. | 423/235 |
| 4,473,658 A | 9/1984 | Schwartz | 502/45 |
| 4,495,305 A * | 1/1985 | Yoo et al. | 502/65 |
| 4,537,875 A * | 8/1985 | Toulhoat et al. | 502/314 |
| 4,613,428 A * | 9/1986 | Edison | 208/113 |
| 4,744,962 A | 5/1988 | Johnson et al. | 423/235 |
| 4,755,282 A | 7/1988 | Samish et al. | 208/113 |
| 4,812,431 A | 3/1989 | Child | 502/42 |
| 4,839,026 A | 6/1989 | Brown et al. | 208/120 |
| 4,923,842 A | 5/1990 | Summers | 502/261 |
| 4,959,339 A * | 9/1990 | Arai | 502/302 |
| 4,973,399 A | 11/1990 | Green et al. | 208/120 |
| 5,015,362 A | 5/1991 | Chin | 208/121 |
| 5,021,144 A | 6/1991 | Altrichter | 208/113 |
| 5,057,205 A | 10/1991 | Chin et al. | 208/121 |
| 5,164,350 A * | 11/1992 | Abe et al. | 502/66 |
| 5,413,699 A | 5/1995 | Chou | 208/113 |
| 5,547,648 A | 8/1996 | Buchanan et al. | 423/210 |
| 5,716,514 A | 2/1998 | Buchanan | 208/113 |
| 5,830,346 A | 11/1998 | Harandi et al. | 208/113 |
| 5,863,855 A * | 1/1999 | Nojima et al. | 502/309 |
| 6,027,696 A | 2/2000 | Das et al. | 422/144 |
| 6,129,834 A | 10/2000 | Peters et al. | 208/120.01 |
| 6,143,167 A | 11/2000 | Peters et al. | 208/113 |
| 6,159,897 A * | 12/2000 | Suzuki et al. | 502/351 |
| 6,165,933 A | 12/2000 | Peters et al. | 502/330 |
| 6,280,607 B1 | 8/2001 | Peters et al. | 208/120.01 |
| 6,492,297 B1 | 12/2002 | Sung | 502/304 |
| 6,511,933 B1 * | 1/2003 | Shibasaki et al. | 502/64 |
| 2001/0016184 A1 | 8/2001 | Campbell et al. | 423/244.06 |

* cited by examiner

$NO_x$ REDUCTION COMPOSITIONS FOR USE IN FCC PROCESSES

This is a continuation of application Ser. No. 10/642,924, which was filed on Aug. 18, 2003, now U.S. Pat. No. 6,881,390.

FIELD OF THE INVENTION

The present invention relates to $NO_x$ reduction compositions and the method of use thereof to reduce $NO_x$ emissions in refinery processes, and specifically in fluid catalytic cracking (FCC) processes. More particularly, the present invention relates to $NO_x$ reduction compositions and their method of use to reduce the content of gas phase reduced nitrogen species in FCC regenerator off gases released from a fluid catalytic cracking unit (FCCU) regenerator operating in a partial or incomplete combustion mode.

BACKGROUND OF THE INVENTION

In recent years there has been an increased concern in the United States and elsewhere about air pollution from industrial emissions of noxious oxides of nitrogen, sulfur and carbon. In response to such concerns, government agencies have in some cases already placed limits on allowable emissions of one or more of the pollutants, and the trend is clearly in the direction of increasingly stringent restrictions.

$NO_x$, or oxides of nitrogen, in flue gas streams exiting from fluid catalytic cracking (FCC) regenerators is a pervasive problem. Fluid catalytic cracking units (FCCU) process heavy hydrocarbon feeds containing nitrogen compounds a portion of which is contained in the coke on the catalyst as it enters the regenerator. Some of this coke nitrogen is eventually converted into $NO_x$ emissions, either in the FCC regenerator or in a downstream CO boiler. Thus all FCCUs processing nitrogen-containing feeds can have a $NO_x$ emissions problem due to catalyst regeneration.

In an FCC process, catalyst particles (inventory) are repeatedly circulated between a catalytic cracking zone and a catalyst regeneration zone. During regeneration, coke from the cracking reaction deposits on the catalyst particles and is removed at elevated temperatures by oxidation with oxygen containing gases such as air. The removal of coke deposits restores the activity of the catalyst particles to the point where they can be reused in the cracking reaction. The coke removal step is performed over a wide range of oxygen conditions. At the minimum, there is typically at least enough oxygen to convert essentially all of the coke made to CO and $H_2O$. At the maximum, the amount of oxygen available is equal to or greater than the amount necessary to oxidize essentially all of the coke to $CO_2$ and $H_2O$.

In an FCC unit operating with sufficient air to convert essentially all of the coke on the catalyst to $CO_2$ and $H_2O$, the gas effluent exiting the regenerator will contain "excess oxygen" (typically 0.5 to 4% of total off gas). This combustion mode of operation is usually called "full burn". When the FCCU regenerator is operating in full burn mode, the conditions in the regenerator are for the most part oxidizing. That is, there is at least enough oxygen to convert (burn) all reducing gas phase species (e.g., CO, ammonia, HCN) regardless of whether this actually happens during the residence time of these species in the regenerator. Under these conditions, essentially all of the nitrogen deposited with coke on the catalyst during the cracking process in the FCCU riser is eventually converted to molecular nitrogen or $NO_x$ and exits the regenerator as such with the off gas. The amount of coke nitrogen converted to $NO_x$ as opposed to molecular nitrogen depends on the design, conditions and operation of the FCCU, and especially of the regenerator, but typically the majority of coke nitrogen exits the regenerator as molecular nitrogen.

On the other hand, when the amount of air added to the FCCU regenerator is insufficient to fully oxidize the coke on the cracking catalyst to $CO_2$ and $H_2O$, some of the coke remains on the catalyst, while a significant portion of the burnt coke carbon is oxidized only to CO. In FCCUs operating in this fashion, oxygen may or may not be present in the regenerator off gas. However, should any oxygen be present in the regenerator off gas, it is typically not enough to convert all of the CO in a gas stream to $CO_2$ according to the chemical stoichiometry of $$CO + \tfrac{1}{2}O_2 \rightarrow CO_2$$

This mode of operation is usually called "partial burn." When an FCC U regenerator is operating in partial burn mode, the CO produced, a known pollutant, cannot be discharged untreated to the atmosphere. To remove the CO from the regenerator off gas and realize the benefits of recovering the heat associated with burning it, refiners typically burn the CO in the regenerator off gas with the assistance of added fuel and air in a burner usually referred to as "the CO boiler". The heat recovered by burning the CO is used to generate steam.

When the regenerator is operating in partial burn, the conditions in the regenerator, where the oxygen added with air has been depleted and CO concentration has built up, are overall reducing. That is, there is not enough oxygen to convert/burn all reducing species regardless if some oxygen is actually still present. Under these conditions some of the nitrogen in the coke is converted to so called "gas phase reduced nitrogen species", examples of which are ammonia and HCN. Small amounts of $NO_x$ may also be present in the partial burn regenerator off gas. When these gas phase reduced nitrogen species are burnt in the CO boiler with the rest of the regenerator off gas, they can be oxidized to $NO_x$, which is then emitted to the atmosphere. This $NO_x$ along with any "thermal" $NO_x$ formed in the CO boiler burner by oxidizing atmospheric $N_2$ constitute the total $NO_x$ emissions of the FCCU unit operating in a partial or incomplete combustion mode.

FCCU regenerators may also be designed and operated in a "incomplete burn" mode intermediate between full burn and partial burn modes. An example of such an intermediate regime occurs when enough CO is generated in the FCCU regenerator to require the use of a CO boiler, but because the amounts of air added are large enough to bring the unit close to full burn operation mode, significant amounts of oxygen can be found in the off gas and large sections of the regenerator are actually operating under overall oxidizing conditions. In such case, while gas phase reduced nitrogen species can still be found in the off gas, significant amounts of $NO_x$ are also present. In most cases a majority of this $NO_x$ is not converted in the CO boiler and ends up being emitted to the atmosphere.

Yet another combustion mode of operating an FCCU is nominally in full burn with relatively low amounts of excess oxygen and/or inefficient mixing of air with coked catalyst. In this case, large sections of the regenerator may be under reducing conditions even if the overall regenerator is nominally oxidizing. Under these conditions reduced nitrogen species may be found in the regenerator off gas along with $NO_x$.

Various catalytic approaches have been proposed to control $NO_x$ emissions in the flue gas exiting from the FCCU regenerator.

For example, recent patents, including U.S. Pat. Nos. 6,280,607, 6,129,834 and 6,143,167, have proposed the use of $NO_x$ removal compositions for reducing $NO_x$ emissions from an FCCU regenerator. U.S. Pat. No. 6,165,933 also discloses a $NO_x$ reduction composition, which promotes CO combustion during an FCC catalyst regeneration process step while simultaneously reducing the level of $NO_x$ emitted during the regeneration step. $NO_x$ reduction compositions disclosed by these patents may be used as an additive, which is circulated along with the FCC catalyst inventory or incorporated as an integral part of the FCC catalyst.

In U.S. Pat. No. 4,290,878, $NO_x$ is controlled in the presence of a platinum-promoted CO oxidative promoter in a full burn combustion regenerator by the addition of iridium or rhodium on the combustion promoter in lesser amounts than the amount of platinum.

U.S. Pat. No. 4,973,399, discloses copper-loaded zeolite additives useful for reducing emissions of $NO_x$ from the regenerator of an FCCU unit operating in full CO-burning mode.

U.S. Pat. No. 4,368,057, teaches the removal of $NH_3$ contaminants of gaseous fuel by reacting the $NH_3$ with a sufficient amount of NO.

However, aforementioned prior art has failed to appreciate an FCC process which minimizes the amount of $NO_x$ and gas phase reduced nitrogen species, e.g. $NH_3$, HCN, in the flue gas of an FCCU regenerator operating in a partial or incomplete combustion mode.

Efforts to control ammonia released in an FCC regenerator operated in a partial or an incomplete mode of combustion have been known.

For example, U.S. Pat. No. 5,021,144 discloses reducing ammonia in an FCC regenerator operating in a partial burn combustion mode by adding a significant excess of the amount of a carbon monoxide (CO) oxidative promoter sufficient to prevent afterburn combustion in the dilute phase of the regenerator.

U.S. Pat. No. 4,755,282 discloses a process for reducing the content of ammonia in a regeneration zone off gas of an FCCU regenerator operating in a partial or incomplete combustion mode. The process requires passing a fine sized, i.e. 10 to 40 microns, ammonia decomposition catalyst to either the regeneration zone of an FCCU, or an admixture with the off gas from the regeneration zone of the FCCU, at a predetermined make-up rate such that the residence time of the decomposition catalyst relative to the larger FCC catalyst particles will be short in the dense bed of the regenerator due to rapid elutriation of the fine sized ammonia decomposition catalyst particles. The fine sized elutriated decomposition catalyst particles are captured by a third stage cyclone separator and recycled to the regenerator of the FCCU. The decomposition catalyst may be a noble group metal dispersed on an inorganic support.

U.S. Pat. No. 4,744,962 is illustrative of a post-treatment process to reduce ammonia in the FCCU regenerator flue gas. The post-treatment involves treating the regenerator flue gas to lessen the ammonia content after the gas has exited the FCCU regenerator but before passage to the CO boiler.

There remains a need in the refining industry for improved compositions and processes which minimizes the content of gas phase reduced nitrogen species and $NO_x$ emitted from a partial or incomplete combustion FCCU regenerator during an FCC process, which compositions are effective and simple to use.

SUMMARY OF THE INVENTION

The essence of the present invention resides in the discovery of particulate compositions which are capable of being circulated throughout a fluid catalytic cracking unit (FCCU) along with the cracking catalyst inventory to minimize the content of gas phase reduced nitrogen species, e.g. $NH_3$ and HCN, and $NO_x$ present in the off gas of the FCCU regenerator when the FCCU regenerator is operated in a partial or incomplete burn mode. Advantageously, the compositions exhibit high efficiencies for the oxidation of gas phase reduced nitrogen species present in the regenerator off gas to molecular nitrogen prior to passage of the off gas to the CO boiler. This reduced content of gas phase reduced nitrogen species in the off gas provides for an overall reduction of $NO_x$ emitted into the atmosphere from the FCCU due to a decrease in the amount of the nitrogen species being oxidized to $NO_x$ in the CO boiler as CO is oxidized to $CO_2$.

Despite the reducing environment in an FCCU regenerator operated in a partial burn or incomplete burn mode, some $NO_x$ may form in the regenerator. In addition to reducing the content of gas phase reduced nitrogen species, compositions of the invention also enhance the removal of any $NO_x$ formed in the partial or incomplete burn regenerator by catalyzing the reaction of $NO_x$ with reductants typically found in the FCCU regenerator, e.g. CO, hydrocarbons, and gas phase reduced nitrogen species, to form molecular nitrogen. Advantageously, the compositions of the invention provide a reduction of $NO_x$ formed in the regeneration prior to the $NO_x$ exiting the regenerator and being passed unabated through the CO boiler into the environment.

In accordance with the present invention, compositions of the invention are comprised of a particulate composition which comprises (i) an acidic metal oxide which contains substantially no zeolite; (ii) an alkali metal, alkaline earth metal, and mixtures thereof, measured as the metal oxide, (iii) an oxygen storage component, and (iv) a noble metal component, preferably platinum, rhodium, iridium or mixtures thereof. In a preferred embodiment of the invention, compositions of the invention are used in the FCC process as separate additives particles circulated along with the circulating FCC catalyst inventory.

The present invention also provides a process for reducing the content of gas phase reduced nitrogen species released from the regenerator of an FCCU operated in a partial or incomplete mode of combustion. In accordance with the present invention, the process comprises contacting under FCC catalytic conditions the off gas of an FCCU regenerator operated in a partial or incomplete combustion mode with an amount of the compositions of the invention effective to oxidize the gas phase reduced nitrogen species to molecular nitrogen. The invention also provides a process for reducing $NO_x$ emissions from an FCC process operated in a partial or incomplete combustion modes using the compositions of the invention.

Accordingly, it is an advantage of this invention to provide compositions which are useful to reduce the content of gas phase reduced nitrogen species released from an FCCU regenerator operating in partial or incomplete combustion modes during an FCC process.

It is also an advantage of this invention to provide compositions which are useful to reduce $NO_x$ emissions from an FCCU regenerator operating in partial or incomplete combustion modes by minimizing the amount of reduced nitrogen species emitted from the regenerator during an FCC process.

Another advantage of the invention is to provide compositions which are effective to oxidize gas phase reduced nitrogen species released from an FCCU regenerator operating in partial or incomplete combustion modes to molecular nitrogen, thereby minimizing the conversion of the reduced nitrogen species to $NO_x$ in the downstream CO boiler.

It is another advantage of this invention to provide compositions which are useful to reduce $NO_x$ emissions from an FCCU regenerator operating in partial or incomplete combustion modes to molecular nitrogen by catalyzing the reaction of $NO_x$ with CO and other reductants typically present in a partial or incomplete burn FCCU regenerator.

It is another advantage of this invention to provide a process for the reduction of the content of $NO_x$ in the off gas of an FCCU regenerator operating in partial or incomplete combustion mode by reducing the content of gas phase reduced nitrogen species being emitted in the off gas released from the regenerator, prior to passage of the gas to a CO boiler, whereby as CO is oxidized to $CO_2$, a lesser amount of the gas phase reduced nitrogen species is oxidized to $NO_x$.

It is another advantage of this invention to provide a process for the reduction of gas phase reduced nitrogen species in an effluent gas stream passed from an FCC regenerator to a CO boiler, whereby as CO is oxidized to $CO_2$ a lesser amount of the reduced nitrogen species is oxidized to $NO_x$.

Another advantage of this invention is to provide a process for the reduction of the content of $NO_x$ in the off gas of an FCCU regenerator operating in a partial or incomplete combustion mode by the reduction of $NO_x$ being emitted in the off gas released from the regenerator, prior to passage of the gas to the CO boiler where the $NO_x$ remains untreated and is eventually released into the environment.

Yet another advantage of this invention is to provide improved partial or incomplete combustion FCC processes using the compositions of the invention.

These and other aspects of the present invention are described in further detail below.

DETAILED DESCRIPTION OF THE INVENTION

Figure 1:
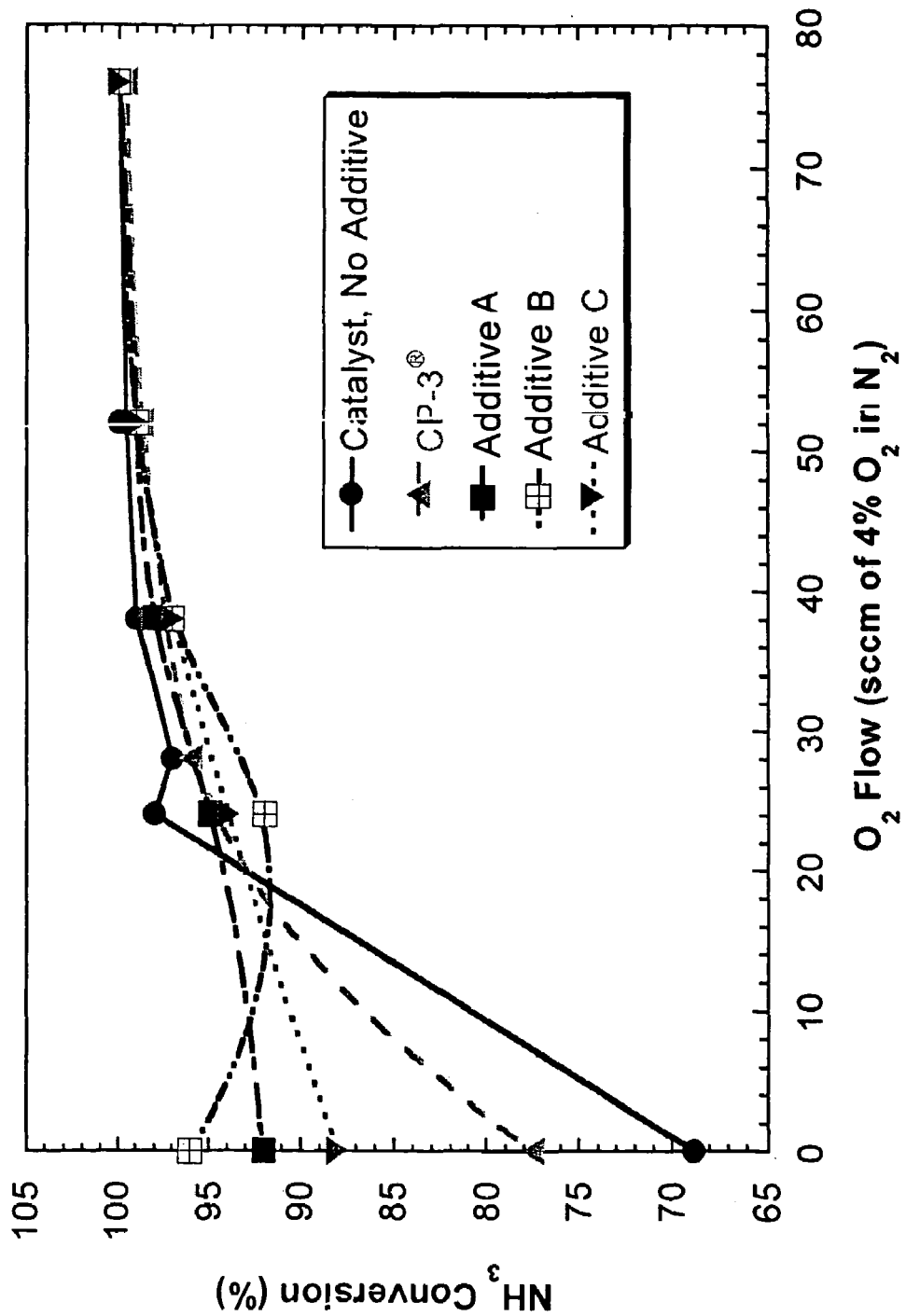
FIG. 1 is a graphic representation of the comparison of ammonia reduction in an RTU where ammonia reacts with CO at various levels of oxygen in a reactor feed in the presence of Additives A, B and C, the cracking catalyst alone, and a commercial combustion promoter, CP-3®.

For purposes of this invention the term "$NO_x$" will be used herein to represent oxides of nitrogen, e.g. nitric oxide, (NO) and nitrogen dioxide ($NO_2$) the principal noxious oxides of nitrogen, as well as $N_2O_4$, $N_2O_5$, and mixtures thereof.

The term reduced "gas phase reduced nitrogen species" is used herein to indicate any gas phase species formed in the regenerator of a fluid catalytic cracking unit during a fluid catalytic cracking process which gas species contain a nitrogen having a nominal charge of less than zero. Examples of gas phase reduced nitrogen species include, but are not limited to, ammonia ($NH_3$), hydrogen cyanide (HCN), and the like.

The present invention encompasses the discovery that certain classes of compositions are very effective for the reduction of the overall $NO_x$ emissions released from an FCCU when the FCCU regenerator is operated in a partial or incomplete burn combustion mode. The compositions of the invention are characterized in that they comprise (i) an acidic metal oxide component which contains substantially no zeolite; (ii) an alkali metal, alkaline earth metal and mixtures thereof; (iii) an oxygen storage component; and (iv) a noble metal component selected from the group consisting of platinum, iridium, rhodium, osmium, ruthenium, rhenium and mixtures thereof.

The acidic metal oxide useful in the compositions of the invention is any metal oxide component having sufficient acidity to adsorb a base, e.g. pyridine, and the like. In accordance with the present invention, the acidic metal oxide contains no or substantially no, i.e. less than 5 wt %, zeolite. Typically, the acidic metal oxide contains at least some alumina. Preferably, the acidic metal oxide contains at least 1 wt % alumina; more preferably, at least 25 wt % alumina; most preferably, at least 50 wt % alumina. It is also within the scope of the invention that the acidic metal oxide may contain other stabilizing metal oxides, such as for example, lanthana, zirconia, yttria, neodymia, samaria, europia, gadolinia and the like. In a preferred embodiment of the invention, the acidic metal oxide is selected from the group consisting of alumina, silica alumina, lanthana alumina and zirconia alumina.

The acidic metal oxide may be crystalline or amorphous. Amorphous silica aluminas are most preferred. Where an amorphous alumina silica is used, it will have an alumina to silica molar ratio of about 1 to 50:1, preferably about 2 to 20:1.

The amount of the acidic metal oxide component present in the composition of the invention will typically be at least 5 wt % of the total composition. Preferably, the amount of the acidic metal oxide component ranges from about 5 to about 98 wt %, more preferable from about 15 to about 95 wt % and even more preferable, from about 20 to about 90 wt % of the total composition.

Further, the acidic metal oxide has a sufficient surface area to promote the reduction of $NO_x$ and gas phase reduced nitrogen species formed in the flue gas of an FCCU regenerator operated in a partial or incomplete combustion mode. Typically, the acidic metal oxide has a BET surface area of at least 5 m$^2$/g. Preferably, the acidic metal oxide has a BET surface area of at 5 to 500 m$^2$/g, more preferably about 70–250 m$^2$/g.

Alkali metals useful to prepare the compositions of the invention include, but are not limited to, sodium, potassium, cesium, lithium and the like. Preferably, the alkali metal component is sodium. The amount of alkali metal present in the composition of the invention is typically at least 0.5 wt % (on a metal oxide basis). Preferably, the amount of alkali metal in the composition ranges from about 1 to about 20 wt %, most preferably, from about 1 to about 10 wt % (on a metal oxide basis) of the total composition.

Alkaline earth metals useful to prepare compositions in accordance with the present invention include, but are not limited to, magnesium, calcium, barium, strontium and the like. Preferably, the alkaline earth metal is magnesium. The amount of alkaline earth metal present in the composition of the invention is at least 0.5 wt % (on a metal oxide basis). Preferably, the amount of the alkaline earth metal ranges from about 0.5 to 60 wt %, most preferably 5 to 40 wt %, (on a metal oxide basis) of the invention composition. It is within the scope of the invention to use the alkali and alkaline earth metals alone or in combination.

The oxygen storage component may be any metal oxide having oxygen storage capability. In a preferred embodiment of the invention, the oxygen storage component is a rare earth metal oxide or a transition metal oxide having oxygen storage capability. Suitable rare earth metal oxides include, but are not limited to, ceria, samaria, praseodymia, europia, terbia and mixtures thereof. Suitable transition metals include vanadia, manganese oxide, iron oxide, nickel oxide, copper oxide, cobalt oxide, chromia, titania, silver oxide, molybdenia, niobia, gold oxide, tungsten oxide, and mixtures thereof. In a most preferred embodiment of the invention at least a portion of the oxygen storage component is ceria. Even more preferred is that the oxygen storage metal oxide component consists essentially of ceria. It is also within the scope of the present invention that the oxygen storage metal oxide component may contain other stabilizing metal oxides such as, for example, zirconia and rare earth metal oxides typically not heretofore known in the art to have oxygen storage capability, e.g., lanthana, neodymia, gadolinia, yttria, scandia, hafnia, and mixtures thereof.

The oxygen storage metal oxide component is preferably present as a micro dispersed phase as opposed to large bulk oxide particles or ions located at exchange sites in the oxide support. The amount of the oxygen storage metal oxide present in the compositions of the invention may vary considerably relative to the amount of acidic metal oxide. Generally, the oxygen storage component is present in the amount of at least 0.1 wt %; preferably from about 1 to 50 wt %; most preferably from about 5 to about 30 wt %, of the total composition.

In general, the noble metal component is any metal of the noble group metals including but not limited to, platinum, palladium, iridium, rhodium, osmium, or ruthenium, rhenium, and mixtures thereof. Preferably, the noble metal component is selected from the group consisting of platinum, iridium, rhodium, osmium, ruthenium, rhenium and mixtures thereof. Most preferably, the noble metal component is platinum, rhodium, iridium and mixtures thereof. Typically, the amount of the noble metal component useful in the present invention, calculated as the metal, is at least 0.1 parts per million, preferably at least 10 parts per million, most preferably at least 25 parts per million. In a preferred embodiment of the invention, the amount of the noble metal component ranges from about 0.1 to 5,000 parts per million, preferably from about 10 to 2500 parts per million, most preferably from about 25 to about 1500 parts per million.

Additional materials optionally present in the compositions of the present invention include, but are not limited to, fillers, binders, etc., provided that said materials do not significantly adversely affect the performance of the compositions to reduce the content of gas phase nitrogen species and NO$_x$ under partial or incomplete combustion conditions. It is preferred, however, that the compositions of the invention consist essentially of components (i) through (iv).

Compositions of the invention are in a particulate form and will typically have any particle size sufficient to permit the composition to be circulated throughout an FCCU simultaneously with the inventory of cracking catalyst during an FCC process. Typically the composition of the invention will have a mean particle size of greater than 45 μm. Preferably, the mean particle size is from about 50 to about 200 μm; most preferably from about 55 to about 150 μm, even more preferred from about 60 to 120 μm. The compositions of the invention typically have a Davison attrition index (DI) value of about 0 to about 50, preferably from 0 to about 20; more preferably 0 to 15.

While the present invention is not limited to any particular process of preparation, typically compositions of the invention are prepared by impregnation of a microspheroidal particulate base material composition comprising components (i)–(iii) with a noble metal source. The base material composition may be prepared using any conventional method, see for example, U.S. Pat. Nos. 6,280,607; 6,129,834 and 6,143,167, which patents teach preparing a base material composition comprising components (i)–(iii) by impregnation of a suitable acidic metal oxide support with precursors of components (ii)–(iii).

In one embodiment of the present invention, the base material composition may be prepared by mixing, preferably with agitation, an aqueous slurry containing an amount of a peptized acidic metal oxide, e.g. a peptized alumina, sufficient to provide at least 1.0 weight percent, preferably at least 25 wt %, most preferably at least. 50 wt %, of the peptized acidic metal oxide in the final composition, and having from about 10 to about 30, preferably from about 20 to about 25, weight percent solids, with an oxygen storage transition metal and/or rare earth metal salt, e.g. a carbonate, nitrate, sulfate, chloride salts and the like, in an amount sufficient to provide at least 0.1 weight percent of an oxygen storage metal oxide, preferably ceria, in the final base material composition. Optionally, the oxygen storage transition metal and/or rare earth metal salt may also contain stabilizing amounts of a stabilizing metal, e.g., zirconium and rare earth metals typically not heretofore known in the art to have oxygen storage capability, e.g., lanthanum, neodymium, gadolinium, yttrium, scandium, hafnium, and mixtures thereof. Preferably, the peptized acidic metal oxide containing slurry also contains an amount of an alkali metal and/or an alkaline earth metal sufficient to provide at least 0.5 wt % of alkali metal and/or alkaline earth metal in the final base material composition.

An additional acidic metal oxide source, e.g. sodium silicate as a silica source, may optionally be added, with agitation, to the oxygen storage metal containing slurry with agitation in an amount sufficient to provide at total of at least 5.0 weight percent, preferably from about 5 to about 98 weight percent, most preferably from about 15 to about 95 weight percent and even more preferable, from about 20 to about 90 weight percent, of acidic metal oxide in the final composition. The oxygen storage metal oxide containing slurry is milled to reduce the particle size of the materials contained in the slurry to 10 microns or less, preferably 5 microns or less. The milled slurry is spray dried to obtain particles having a mean particle size of greater than 45 µm, preferably from about 50 to 200 µm, most preferably from about 55 to 150 µm, and calcined at a sufficient temperature and for a sufficient time to form the corresponding metal oxides, preferably from about 400° C. to about 800° C. for about thirty minutes to about 4 hours.

Optionally, the calcined metal oxide particles are treated with at least one aqueous alkali metal and/or alkaline earth metal salt solution in an amount sufficient to impregnate the particles and provide at least 0.5 weight percent alkali metal and/or alkaline earth metal in the final base material composition. Suitable salts for preparing the impregnating solutions include, but are not limited to, carbonates, bicarbonates, chlorides, nitrates, silicates and the like. The impregnated particles are thereafter dried and calcined at a temperature and for a time sufficient to form the corresponding metal oxide, e.g. from about 400° C. to about 800° for about thirty minutes to about 4 hours.

The peptized acidic metal oxide containing slurry used to prepare the base material composition may be prepared by (i) forming an aqueous slurry containing an amount of at least one acidic metal oxide, preferably alumina, sufficient to provide at least 1.0 weight percent, preferably at least 25 wt %, most preferably at least 50 wt %, of the peptized acidic metal oxide in the final composition, and having from about 10 to about 30, preferably, 20 to about 25, weight percent solids and (ii) adding to the slurry an alkali base, e.g. sodium hydroxide, potassium hydroxide, sodium aluminate and the like, and/or an alkaline earth metal base, e.g. magnesium hydroxide, calcium hydroxide and the like, in an amount sufficient to peptize the acidic metal oxide and provide at least 0.5 weight percent alkali metal and/or alkaline earth metal in the final base material composition. In general the amount of alkali metal and/or alkaline earth metal base used ranges from about 0.01 to 1.0 mole of alkali base per mole of acidic metal oxide, preferably 0.4 to 0.7 mole of alkali base per mole of acidic metal oxide. Thereafter the slurry is aged, preferably with continuous agitation, at a temperature and for a time sufficient to permit complete peptization of the acidic metal oxide contained in the slurry and obtain a high attrition resistant material having a Davison Index (DI) of 0 to about 50, preferably, from 0 to about 20, most preferably, from 0 to 15. Preferably the slurry is aged from about room temperature to about 90° C. for about 30 minutes to about 4 hours. Generally, the peptizable acidic metal oxide containing slurry is prepared by contacting an aqueous solution with a peptizable acidic metal oxide. It is within the scope of the invention that the peptizable acidic metal oxide contained in the slurry will also contain stabilizing amounts of stabilizing metal oxides, such as for example, lanthana, zirconia, yttria, neodymia, samaria, europia, gadolinia and the like. Optionally, the stabilizing metal oxides may be added in stabilizing amounts to the peptizable acidic oxide containing slurry.

It is also within the scope of the invention to form the peptized acidic metal oxide containing slurry by peptization of the acidic metal oxide using an acid. In this case, a suitable acid, e.g. hydrochloric acid, formic acid, nitric acid, citric acid, sulfuric acid, phosphoric acid, acetic acid and the like, is added to the acidic metal oxide containing slurry in an amount sufficient to peptize the acidic metal oxide and obtain a high attrition resistant material as indicated by a DI of 0 to about 50, preferably from 0 to about 20, most preferably from 0 to 15. In general, the amount of acid used ranges from about 0.01 to 1.0, preferably from about 0.05 to 0.6, mole of acid per mole of acidic metal oxide. Thereafter the slurry is aged as herein described above.

In a preferred embodiment of the invention, the base material composition is prepared by (1) preparing an aqueous acidic metal oxide slurry having from about 10 to about 30 percent solids, (2) adding to the slurry, preferably with agitation, a sufficient amount of an alkali base and/or an alkaline earth metal base in an amount sufficient to peptize the acidic metal oxide and provide at least 0.5 weight percent of alkali metal and/or alkaline earth metal, measured as the metal oxide in the final base material composition, (3) aging the base peptized acidic metal oxide containing slurry at a sufficient temperature and for a sufficient time to permit complete peptization of the acidic metal oxide in the slurry, (4) adding to the peptized slurry an oxygen storage metal salt in an amount sufficient to provide at least 0.1 weight percent of at least one oxygen storage metal oxide in the final base material composition, (5) optionally, adding to the slurry an additional acidic metal oxide source, e.g. sodium silicate to provide silica, to provide an additional acidic metal oxide (6) diluting the resulting slurry with water to provide a solids concentration of about 5 to 25, preferably, from about 10 to about 20, weight % of the slurry, (7) milling the slurry to reduce the particle size of the materials contained in the slurry to 10 microns or less, preferably 5 microns or less, (8) spray-drying the milled slurry to obtain particles having a mean particle size of greater than 45 µm, preferably from about 50 to about 200 µm, more preferably from about 55 to 150 µm and most preferably from about 60 to 120 µm, (9) optionally drying the spray-dried particles at a sufficient temperature and for a sufficient time to remove volatiles, e.g. at about 100° C. to about 250° C. for about 1–4 hours, and (10) calcining the dried particles at a sufficient temperature and for sufficient time to form the corresponding metal oxides as described hereinabove. In the most preferred embodiment of the invention, the base material composition is prepared by sequentially performing steps (1) through (10) hereinabove.

Final compositions in accordance with the invention are prepared by impregnating the base material with an aqueous solution of at least one noble metal salt, e.g. nitrate, chloride, carbonates and sulfates salts, amine complexes, and the like, in an amount sufficient to provide at least 0.1 parts per million of noble metal, measured as the metal, in the final catalyst/additive composition and thereafter drying the impregnated particles to remove volatiles, e.g. typically at about 100° C. to 250° C. for 1 to 4 hours.

Compositions in accordance with the invention may be used as a component of a cracking catalyst in an FCC process to reduce gas phase reduced nitrogen species thereby reducing total $NO_x$ emissions. In a preferred embodiment of the invention, the compositions are used in the form of a separate particle additive which is circulated along with the main cracking catalyst throughout the FCCU. Alternatively, the compositions of the invention are included as an additional component of the cracking catalyst to provide an integrated cracking/$NO_x$ reduction catalyst system.

Where the invention composition is used as a separate additive particulate, (as opposed to being integrated into the FCC catalyst particles themselves), the composition is used in an amount of at least 0.01 wt % of the FCC catalyst inventory. Preferably, the amount of the invention composition used ranges from about 0.01 to about 50 wt %, most preferably from about 0.1 to about 20 wt %, of the FCC catalyst inventory. As separate particle additives, compositions of the invention may be added to the FCCU in the conventional manner, e.g. with make-up catalyst to the regenerator, or by any other convenient method.

Where compositions of the invention are integrated into the FCC catalyst particles themselves, any conventional FCC catalyst particle components may be used in combination with the compositions of the invention. If integrated into the FCC catalyst particles, the composition of the invention, typically represents at least about 0.01 wt % of the FCC catalyst particle. Preferably, the amount of the invention compositions used ranges from about 0.01 to about 50 wt %, most preferably from about 0.1 to about 20 wt %, of the FCC catalyst particles.

Somewhat briefly, the FCC process involves the cracking of heavy hydrocarbon feedstocks to lighter products by contact of the feedstock in a cyclic catalyst recirculation cracking process with a circulating fluidizable catalytic cracking catalyst inventory consisting of particles having a size ranging from about 50 to about 150 µm, preferably from about 60 to about 120 µm. The catalytic cracking of these relatively high molecular weight hydrocarbon feedstocks result in the production of a hydrocarbon product of lower molecular weight. The significant steps in the cyclic FCC process are:

(i) the feed is catalytically cracked in a catalytic cracking zone, normally a riser cracking zone, operating at catalytic cracking conditions by contacting feed with a source of hot, regenerated cracking catalyst to produce an effluent comprising cracked products and spent catalyst containing coke and strippable hydrocarbons;

(ii) the effluent is discharged and separated, normally in one or more cyclones, into a vapor phase rich in cracked product and a solids rich phase comprising the spent catalyst;

(iii) the vapor phase is removed as product and fractionated in the FCC main column and its associated side columns to form gas and liquid cracking products including gasoline;

(iv) the spent catalyst is stripped, usually with steam, to remove occluded hydrocarbons from the catalyst, after which the stripped catalyst is oxidatively regenerated in a catalyst regeneration zone to produce hot, regenerated catalyst which is then recycled to the cracking zone for cracking further quantities of feed.

Conventional FCC catalysts include, for example, zeolite based catalysts with a faujasite cracking component as described in the seminal review by Venuto and Habib, *Fluid Catalytic Cracking with Zeolite Catalysts*, Marcel Dekker, New York 1979, ISBN 0-8247-6870-1 as well as in numerous other sources such as Sadeghbeigi, *Fluid Catalytic Cracking Handbook*, Gulf Publ. Co. Houston, 1995, ISBN 0-88415-290-1. Typically, the FCC catalysts consist of a binder, usually silica, alumina, or silica alumina, a Y type zeolite acid site active component, one or more matrix aluminas and/or silica aluminas, and fillers such as kaolin clay. The Y zeolite may be present in one or more forms and may have been ultra stabilized and/or treated with stabilizing cations such as any of the rare earths.

Typical FCC processes are conducted at reaction temperatures of 480° C. to 600° C. with catalyst regeneration temperatures of 600° C. to 800° C. As it is well known in the art, the catalyst regeneration zone may consist of a single or multiple reactor vessels. The compositions of the invention may be used in FCC processing of any typical hydrocarbon feedstock. The amount of the composition of the invention used may vary depending on the specific FCC process.

Preferably, the amount of the compositions used is an amount sufficient to reduce the content of gas phase reduced nitrogen species in the flue gas of an FCCU regenerator operated in a partial or incomplete mode of combustion. Typically, the amount of the compositions used is at least 0.01 wt %, preferably from about 0.01 to about 50 wt %, most preferably from about 0.1 to 20 wt % of the cracking catalyst inventory.

In order to remove coke from the catalyst, oxygen or air is added to the regeneration zone. This is performed by a suitable sparging device in the bottom of the regeneration zone, or if desired, additional oxygen is added to the dilute phase of the regeneration zone. In the present invention an under-stoichiometric quantity of oxygen is provided to operate the regeneration zone in a partial or incomplete combustion mode.

The presence of the compositions in accordance with the invention during the catalyst regeneration step dramatically reduces the emissions of gas phase reduced nitrogen species in the FCCU regenerator effluent. By removing the gas phase reduced nitrogen species from the effluent of the FCCU regenerator, significant reduction of $NO_x$ emissions from the CO boiler is achieved. In some cases, $NO_x$ reduction up to 90% is readily achievable using the compositions and method of the invention.

To further illustrate the present invention and the advantages thereof, the following specific examples are given. The examples are given as specific illustrations of the claimed invention. It should be understood, however, that the invention is not limited to the specific details set forth in the examples.

All parts and percentages in the examples as well as the remainder of the specification which refers to solid compositions or concentrations are by weight unless otherwise specified. However, all parts and percentages in the examples as well as the remainder of the specification referring to gas compositions are molar or by volume unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLES

The efficiency of the compositions of the invention to reduce $NO_x$ and/or gas phase reduced nitrogen species from an FCCU regenerator operating in a partial or incomplete burn mode was evaluated in the Examples using a Regenerator Test Unit (RTU) and model reactions. The RTU is an apparatus specifically designed to simulate the operation of an FCCU regenerator. The RTU is described in detail in G. Yaluris and A. W. Peters "Studying the Chemistry of the FCCU Regenerator Under Realistic Conditions," Designing Transportation Fuels for a Cleaner Environment, J. G. Reynolds and M. R. Khan, eds., p. 151, Taylor & Francis, 1999, ISBN: 1-56032-813-4, which description is herein incorporated by reference.

The model reaction for determining the ability of the compositions of the invention to reduce gas phase reduced nitrogen species without converting the species to $NO_x$ in the RTU was the reaction of $NH_3$ over a cracking catalyst inventory containing the additive tested in the presence of CO and various amounts of $O_2$. In this experiment $NH_3$ represents the gas phase reduced nitrogen species, and CO and $O_2$ represent the other reductants and oxidizers typically found in an FCC unit regenerator operating in partial burn. As the $O_2$ level in the reactor changes, the various reducing/oxidizing conditions that can be encountered from regenerator to regenerator or inside the same regenerator can be simulated. The key measurement in this experiment in addition to $NH_3$ conversion, is how much of the $NH_3$ is converted to $NO_x$ if any. It is desirable that the latter conversion is as low as possible for the widest range of $O_2$ amounts in the reactor.

The ability of compositions of the invention to convert $NO_x$ in a FCCU regenerator operated in a partial or incomplete burn mode was determined in the RTU by measuring the activity of the composition to catalyze the reaction of $NO_x$ with CO. The key performance measurement in this test is the $NO_x$ conversion. It is desirable to have high $NO_x$ conversion to nitrogen for a wide range of $O_2$ amounts.

Gas phase reduced nitrogen species are reductants for reducing $NO_x$ after it is formed. The ability of compositions of the invention to catalyze this reaction while simultaneously converting the reduced nitrogen species to molecular nitrogen was determined by measuring in the RTU the activity of the compositions for converting $NH_3$ with $NO_x$ under various $O_2$ levels, simulating the reducing/oxidizing conditions possible in a regenerator operating in partial burn. Itis desirable in this experiment to have high $NO_x$ conversion to nitrogen.

Example 1

A silica-alumina slurry was prepared by adding 30 pounds of SRSII silica-alumina powder to 57 pounds of water that have been heated to 38 IC. (SRSII sold by Grace Davison, a Business Unit of W.R. Grace & Co.-Conn., in Columbia, Md., silica-alumina powder contained 6% $SiO_2$, 94% $Al_2O_3$ and had a moisture content of 33%.) The slurry was prepared in a steam-jacketed stainless steel tank fitted with an electric powered agitator. Six pounds of an aqueous hydrochloric acid solution (35% HCl) and 6.7 pounds of an aqueous aluminum chlorohydrol solution (22% $Al_2O_3$) were added to the silica-alumina slurry. The mixture was heated to 55° C. and allowed to age at this temperature for 4 hours with continuous agitation. After the age period, 15.3 pounds of cerium carbonate crystals (obtained from Rhone Poulenc, Inc., 96% $CeO_2$, 4% $La_2O_3$, 50% moisture) was added to the tank and 30 pounds of water were added to the tank to reduce the solid content of the slurry to 20 wt %.

The mixture was milled in a Draiswerke horizontal media mill of ca. 12 L working volume, filled to about 80% of the volume with 1.2 mm diameter glass beads. The slurry was pumped at a rate of about 2.3 liters per minute. This milling reduced the average particle size of the materials contained in the slurry to less than 10 microns.

The milled slurry was fed to a 10 ft. diameter Bowen Engineering spray drier fitted with a rotary atomizer. The spray drier was operated at 315° C. inlet air temperature and 138° C. outlet air temperature. The slurry feed rate was used to control the outlet air temperature. The rotational speed of the atomizer was adjusted until ~50% of the product microspheres were retained on a No. 200 screen.

The spray dried product was loaded into stainless steel trays and heat treated for 2 hours at 675° C. Only enough material was loaded in each tray so as to obtain a thin layer (~¼ inch) of catalyst on the bottom of each tray.

A one-third portion of the material was then charge into a small Eirich mixer and sprayed with a aqueous solution of sodium carbonate to obtain about 5% $Na_2O$ in the final product. The amount of solution was adjusted not to exceed the water pore volume of the powder. The impregnated material was dried in an oven at 120° C. overnight and calcined for 2 hours at 675° C. The final composition had the following analysis: 66.2% $Al_2O_3$, 3.9% $SiO_2$, 23.9% $CeO_2$, 1% $La_2O_3$, 5% $Na_2O$.

Example 2

An aqueous slurry of peptizable alumina was prepared by combining 27.8 pounds of Versal-700 alumina powder (obtained from LaRoche Industries, Inc., 99% $Al_2O_3$, 30% moisture) with 52 pounds of water at room temperature in a well agitated tank. While mixing, 2.7 pounds of a sodium hydroxide solution were slowly added to the slurry and the mixture was aged for 20 minutes at room temperature. At the end of the age period, 4.5 pounds of a sodium silicate solution (27.3% $SiO_2$, 5.7% $Na_2O$) and 13.6 pounds of cerium carbonate crystals were added to the slurry. Additional water was added to the slurry to bring the solids concentration to 12%. The material was milled, spray dried and calcined using the methods described in Example 1. The final composition had the following analysis: 67.4% $Al_2O_3$, 4.3% $SiO_2$, 22.9% $CeO_2$, 0.9% $La_2O_3$ and 4.5% $Na_2O$.

Example 3

An aqueous solution was prepared consisting of 3 pounds of Lignosite-823 surfactant (obtained from Georgia-Pacific West, Inc.) in 180 pounds of water at room temperature. Twenty six pounds of Versal-700 alumina powder (obtained from LaRoche Industries, Inc., 99% $Al_2O_3$, 30% moisture) and 29.3 pounds of an aqueous formic acid solution (45% $CH_2O_2$) were added to the Lignosite solution. The slurry was allowed to age for 10 minutes with continuous agitation and then 12 pounds of cerium carbonate crystals were slowly added with continuous agitation. The slurry was milled, spray dried and calcined as described in Example 1 above.

The calcined product was loaded into an Eirich mixer and sprayed with a aqueous solution of sodium silicate containing 9.2% $SiO_2$ and 1.92% $Na_2O$. The impregnated material was dried in an oven at 120° C. overnight and calcined for 2 hours at 675° C. The product was impregnated again with an aqueous solution of sodium carbonate containing 7.0% $Na_2O$, followed by drying and calcining as described in Example 1 above.

Example 4

A microspheriodal particulate support material was prepared as a base material for the preparation of a $NO_x$ composition of the invention. A slurry was prepared from an aqueous slurry having 20% solids of a peptizable alumina (Versal 700 alumina powder obtained from La Roche Industries Inc., 99% $Al_2O_3$, 30% moisture). The alumina slurry was prepared using 31.6 lbs of the alumina. To the alumina slurry 3.87 lbs of an aqueous sodium hydroxide solution (50% NaOH) was added. Next, 10.4 lbs of cerium carbonate crystals (obtained from Rhone Poulenc, Inc., 96% $CeO_2$, 4% $La2O_3$, 50% moisture) was added to the slurry. The slurry was diluted in with a sufficient amount of water to bring the solids concentration of the slurry to 12%. Finally, 3.38 lbs of exchanged silica sol of Nalco 1140 (obtained from Nalco Chemicals Co.) was added to the slurry. The mixture was agitated to assure good mixing and then milled in a stirred media mill to reduce agglomerates to substantially less than 10 microns. The milled mixture was then spray dried as described in Example 1 to form approximately 70 micron microspheres and thereafter calcined at approximately 650° C. to remove volatiles. The resulting material had the following analysis: 2.3% total volatiles, and approximately 4.5% $SiO_2$, 5% $Na_2O$, 16.8% $CeO_2$ and 73% $Al_2O_3$, and BET surface area of 140 $m^2/g$.

Example 5

A composition, Additive A, was prepared in accordance with the present invention using the base material prepared in Example 4. 80.0 g of the base material was placed in an inclined beaker on a mechanical rotator. A platinum impregnation solution was prepared by weighing out 0.1715 g of an aqueous platinum tetramine dihydroxide solution (22.79% platinum) and diluting with DI water to 100 g total. The base material was then impregnated by gradually spraying with 50 g of the dilute Pt solution through an air mist spray nozzle system. The wet impregnated base material was dried in an oven at 120° C. overnight. The dried cake was in the form of large chunks and was first ground in a blender and screened before calcining at 650° C. for two hours to decompose the nitrates and remove volatiles. The resulting material contained: 72.5% $Al_2O_3$, 4.4% $SiO_2$, 5% $Na_2O$, 18.8% $CeO_2$, 331 ppm Pt and had a BET surface area of 135 $m^2/g$.

Example 6

A composition, Additive B, was prepared in accordance with the present invention using the base material prepared in Example 4. 80.0 g of the base material was placed in an inclined beaker on a mechanical rotator. A master Rh solution was prepared by diluting 1.0098 g of an aqueous rhodium nitrate salt solution (10% Rh) to 77.48 g of DI water. The base material was then impregnated by gradually spraying with 60 g of the dilute Rh solution through an air mist spray nozzle system. The wet impregnated material was dried in an oven at 120° C. overnight. The dried cake was in the form of large chunks and was first ground in a blender and screened before calcining at 650° C. for two hours to decompose the nitrates and remove volatiles. The resulting material contained: 73.2% $Al_2O_3$, 4.5% $SiO_2$, 5.1% $Na_2O$, 17.5% $CeO_2$, 1005 ppm Rh and had a BET surface area of 127 $m^2/g$.

Example 7

A composition, Additive C, was prepared in accordance with the present invention using the base material prepared in Example 4. 80.0 g of the base material was placed in an inclined beaker on a mechanical rotator. A master Rh solution was prepared by diluting 1.0098 g of an aqueous rhodium nitrate salt solution (10% Rh) to 77.48 g of DI water. A further dilution was prepared by removing 5.83 g of the previously made master dilution and adding DI water to 60 g total weight. The base material was then impregnated by gradually spraying with 60 g of the latter dilute Rh solution through an air mist spray nozzle system. The wet impregnated material was dried in an oven at 120° C. overnight. The dried cake was in the form of large chunks and was first ground in a blender and screened. The dried cake containing ~100 ppm Rh was placed in an inclined beaker on a mechanical rotator. A platinum impregnation solution was prepared by weighing out 0.1715 g of an aqueous platinum tetramine dihydroxide solution (22.79% Pt) and diluting with DI water to 100 g total. 50 g of said solution was then impregnated onto the dried rhodium containing powder by gradually spraying through an air mist spray nozzle system. The wet impregnated material was dried in an oven at 120° C. overnight. The dried cake was in the form of large chunks and was first ground in a blender and screened before calcining at 650° C. for two hours to decompose the nitrates and remove volatiles. The resulting material contained: 72.5% $Al_2O_3$, 4.3% $SiO_2$, 5.1% $Na_2O$, 16.9% $CeO_2$, 90 ppm Rh, 355 ppm Pt, and had a BET surface area or 134 $m^2/g$.

Example 8

The activity of Additives A, B and C to reduce $NH_3$ in an FCC unit regenerator operating in partial burn or incomplete combustion was compared to the activity of the cracking catalyst alone and a commercially available CO combustion promoter, CP-3® (platinum on alumina) (sold by Grace Davison, a business unit of W.R. Grace & Co.-Conn., Columbia, Md.). The experiments were conducted by reacting in the RTU reactor $NH_3$ with CO at various levels of $O_2$, simulating partial burn. After calcination for 2 hours at 595° C., the additive was blended at 0.5% level with FCC catalyst, which had been deactivated for 4 hours at 816° C. in a fluidized bed reactor with 100% stream. CP-3® was blended at 0.25% with the cracking catalyst. The cracking catalyst alone, and the platinum-based CO combustion promoter Grace Davison CP-3® or the additive/cracking catalyst blend were separately fed to the RTU reactor operating at 700° C. The gas feed to the RTU was a mixture of $NH_3$ and CO containing approximately 600 ppm $NH_3$, 5000–5500 ppm CO, various amounts of $O_2$ added as 4% $O_2$ in $N_2$, with the balance being nitrogen. The total gas feed rate excluding the $O_2$ containing gas feed was 1000–1100 sccm. The results are recorded in FIG. 1 and FIG. 2 below.

Figure 2:
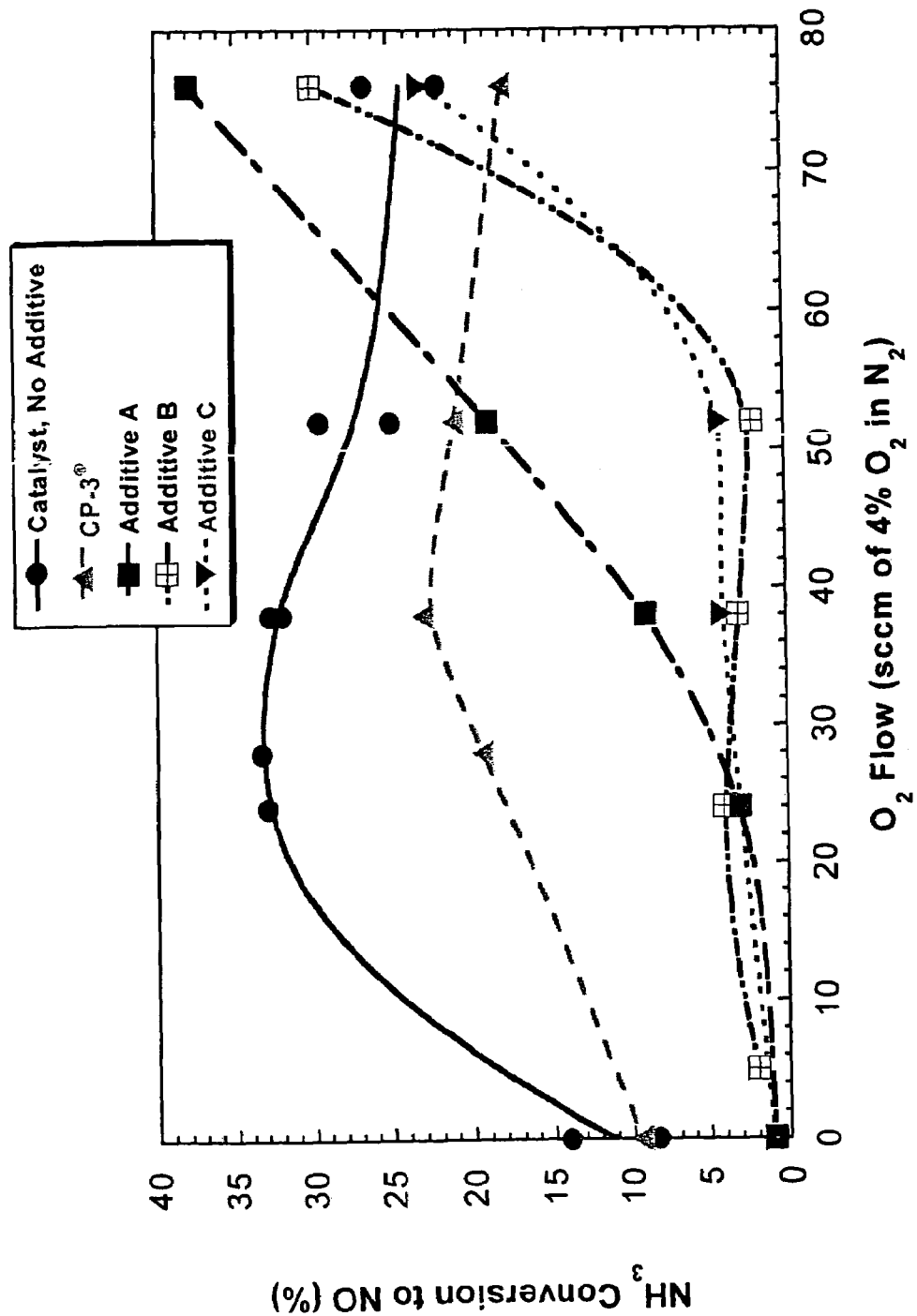
FIG. 2 is a graphic representation of the comparison of ammonia conversion to NO in an RTU where ammonia reacts with CO at various levels of oxygen in a reactor feed in the presence of the Additives A, B and C, the cracking catalyst alone, and a commercial combustion promoter, CP-3®.

As shown in FIGS. 1 and 2, Additives A, B and C are very effective in minimizing $NH_3$ and preventing its conversion to $NO_x$. No other nitrogen oxides (e.g., $NO_2$ or $N_2O$) were detected, indicating the conversion of $NH_3$ to molecular nitrogen. Additives B and C are the most effective of the three additives. The activity of additives A, B, and C for reducing $NH_3$ under partial burn conditions was far superior to that of the conventional combustion promoter, like the commercially available CP®-3.

Example 9

The activity of Additives A, B and C for reducing $NH_3$ and $NO_x$ present in an FCC unit regenerator operating in partial burn or incomplete combustion was also compared to the activity of the cracking catalyst alone and a commercially available CO combustion promoter, CP-3®, using the reaction of $NH_3$ with $NO_x$ under partial burn conditions. The experiments were conducted as in example 8 except that the gas mixture fed to the RTU reactor contained approximately 1000 ppm $NH_3$ and 500–550 ppm $NO_x$ as well as various amounts of oxygen with the balance nitrogen. The results are recorded in FIG. 3 and FIG. 4 below.

Figure 3:
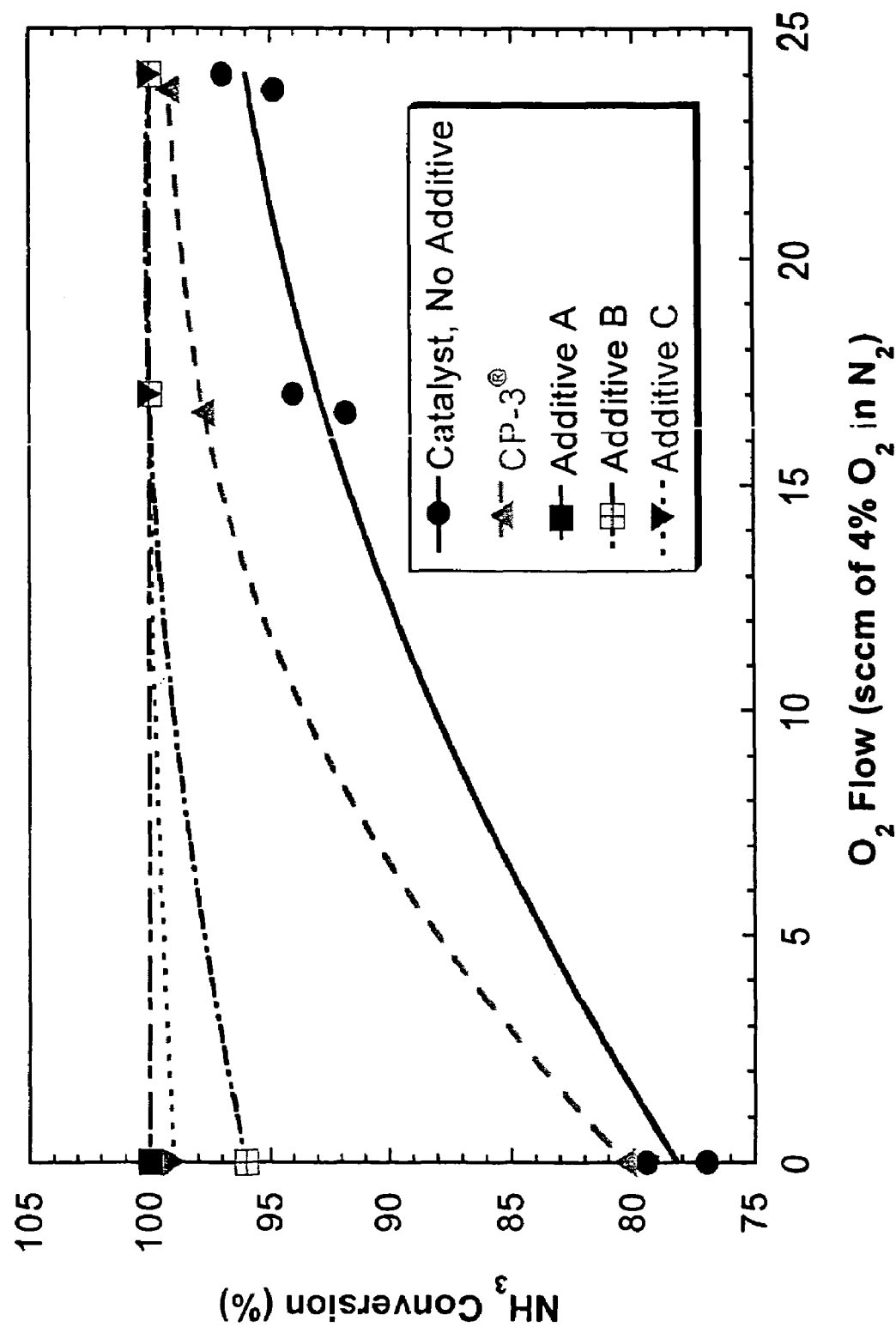
FIG. 3 is a graphic representation of the comparison of ammonia conversion in an RTU where ammonia reacts with $NO_x$ at various levels of $O_2$ in a reactor feed in the presence of Additives A. B and C, the cracking catalyst alone, and a commercial combustion promoter, CP-3®.
Figure 4:
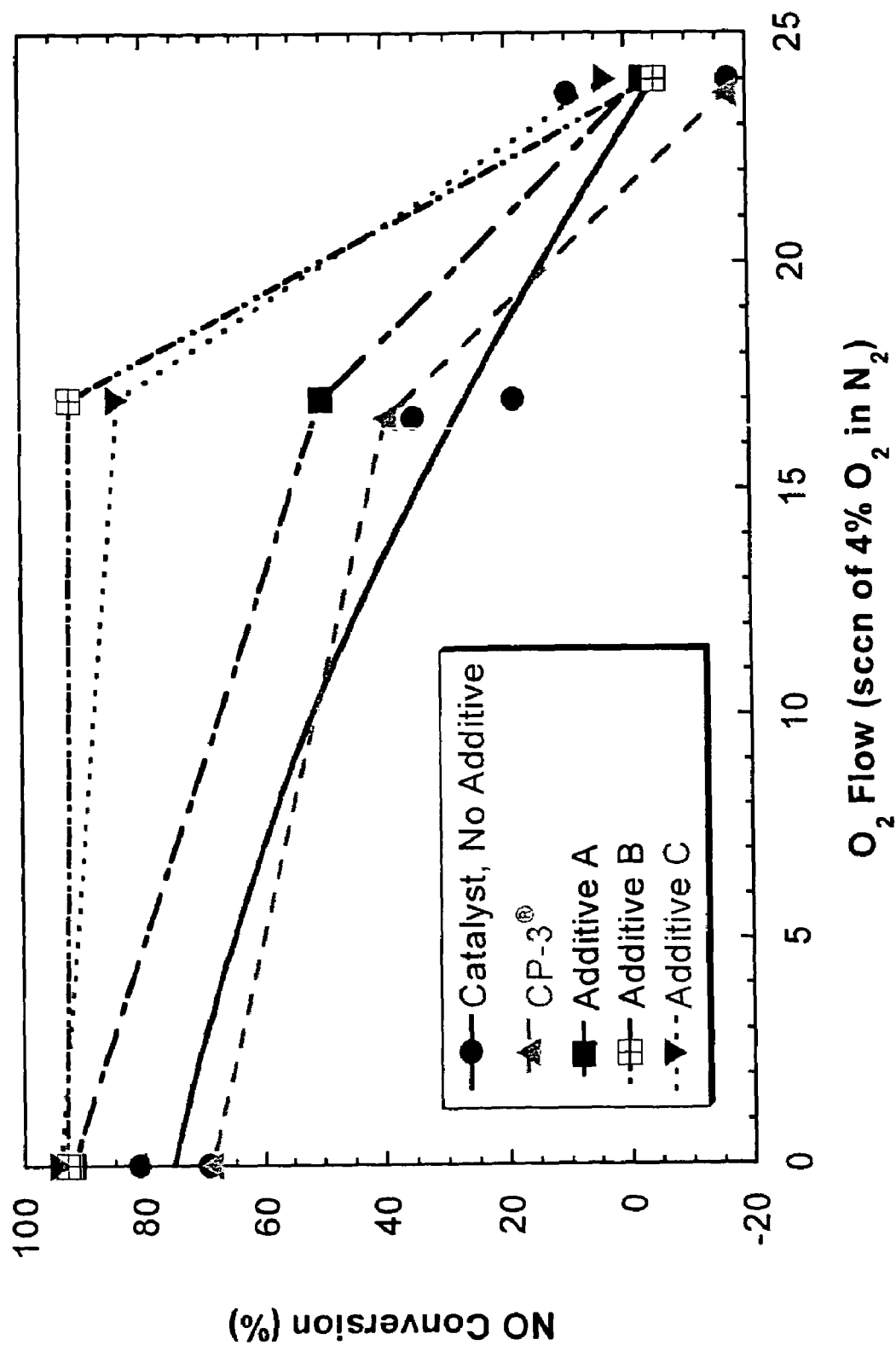
FIG. 4 is a graphic representation of the comparison of $NO_x$ conversion in an RTU where ammonia reacts with $NO_x$ at various levels of $O_2$ in a reactor feed in the presence of Additives A, B and C, the cracking catalyst alone, and a commercial combustion promoter, CP-3®.

As shown in FIG. 3 and FIG. 4, compositions of the invention, i.e. Additives A, B and C, showed enhanced conversion of $NH_3$ and $NO_x$ to molecular nitrogen. No other nitrogen oxides, like $N_2O$ or $NO_2$, were detected during these experiments, indicating the conversion of $NH_3$ to molecular nitrogen.

Example 10

The activity of Additives A, B and C to reduce $NO_x$ formed in an partial burn or incomplete burn FCCU was compared to that of the cracking catalyst alone and a commercially-available, platinum-containing combustion promoter, CP-3®, by measuring the activity of the materials to covert $NO_x$ to molecular nitrogen in the presence of CO at various levels of oxygen. The experiments were conducted as in Example 8 except that the gas feed to the reactor was a mixture containing 5000–5500 ppm CO, 500–550 ppm $NO_x$, various amounts of oxygen added as 4% $O_2/N_2$, and the balance nitrogen. The results are recorded in FIG. 5 below.

Figure 5:
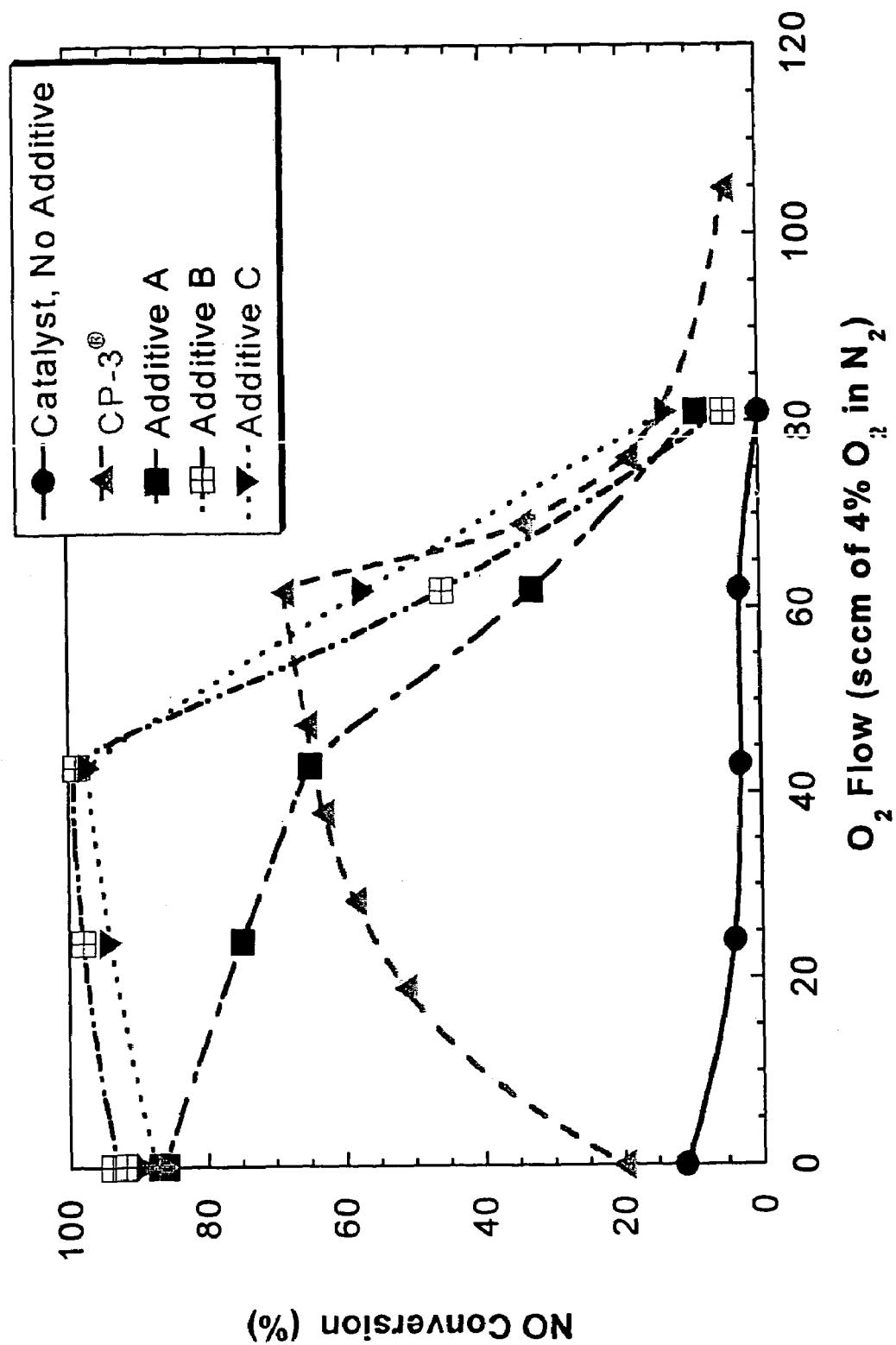
FIG. 5 is a graphic representation of the comparison of $NO_x$ conversion in an RTU where $NO_x$ reacts with CO at various levels of $O_2$ in a reactor feed in the presence of Additives A, B and C, the cracking catalyst alone, and a commercial combustion promoter, CP-3®.

FIG. 5 show that Additives A, B and C are very effective for converting $NO_x$ under partial burn conditions. They are also more effective than the combustion promoter at low levels of oxygen simulating partial burn. No other nitrogen oxides like $N_2O$ or $NO_2$ were detected.

What is claimed is:

1. A composition for reducing the content of $NO_x$ and gas phase reduced nitrogen species during catalyst regeneration in a fluid catalytic cracking (FCC) process said composition comprising particles having a mean particle size of about 50 to about 200 µm and comprising (i) at least about 5.0 wt % of acidic metal oxide containing substantially no zeolite; (ii) a metal component selected from the group consisting of alkali metal, alkaline earth metal, and mixtures thereof; (iii) at least 0.1 wt %, measured as metal oxide, of an oxygen storage metal oxide; and (iv) at least 0.1 ppm of a noble metal component comprising palladium and at least one metal selected from the group consisting of platinum, iridium, rhodium, osmium, ruthenium, rhenium and mixtures thereof, said metal component (ii) being present in amount of at least 0.5 wt %, measured as metal oxide, of the composition.

2. The composition of claim 1 wherein the acidic metal oxide is selected from the group consisting of alumina, silica alumina, lanthana alumina and zirconia alumina.

3. The composition of claim 2 wherein the said acidic metal oxide is silica alumina.

4. The composition of claim 1 wherein the acidic metal oxide further comprises at least one stabilizing metal oxide.

5. The composition of claim 4 wherein the stabilizing metal oxide is selected from the group consisting of yttria, neodymia, samaria, europia, gadolinia and mixtures thereof.

6. The composition of claim 1 wherein the component (ii) is alkali metal.

7. The composition of claim 6 wherein said alkali metal is selected from the group consisting of sodium, potassium, cesium, lithium and mixtures thereof.

8. The composition of claim 7 wherein the alkali metal is sodium or potassium.

9. The composition of claim 8 wherein the alkali metal is sodium.

10. The composition of claim 1 wherein component (ii) contains an alkaline earth metal.

11. The composition of claim 10 wherein the alkaline earth metal is selected from the group consisting of magnesium, calcium, barium, strontium and mixtures thereof.

12. The composition of claim 11 wherein the alkaline earth metal is magnesium.

13. The composition of claim 1 wherein the oxygen storage component (iii) is a rare earth metal oxide having oxygen storage capability, a transition metal oxide having oxygen storage capability, and mixtures thereof.

14. The composition of claim 13 wherein the oxygen storage component (iii) is a rare earth metal oxide having oxygen storage capability.

15. The composition of claim 14 wherein the rare earth metal oxide is selected from the group of ceria, samaria, praseodymia, europia, terbia and mixtures thereof.

16. The composition of claim 15 wherein at least a portion of the rare earth metal oxide comprises ceria.

17. The composition of claim 16 wherein the rare earth metal oxide consists essentially of ceria.

18. The composition of claim 13 wherein the oxygen storage component (iii) is a transition metal oxide having oxygen storage capability.

19. The composition of the above claim 18 wherein the transition metal oxide is selected from the group consisting of vanadium, manganese oxide, iron oxide, nickel oxide, copper oxide, cobalt oxide, chromia, titania, silver oxide, molybdenia, niobia, gold oxide, tungsten oxide and mixtures thereof.

20. The composition of claim 13 wherein the oxygen storage metal oxide component (iii) further comprises at least one stabilizing metal oxide.

21. The composition of claim 20 wherein the stabilizing metal oxide is selected from the group consisting of zirconia, lanthana, neodymia, gadolinia, yttria, scandia, hafnia and mixtures thereof.

22. The composition of claim 1 wherein the noble metal component is selected from the group consisting of platinum iridium, rhodium and mixtures thereof.

23. The composition of claim 22 wherein the noble metal component is selected from the group consisting of rhodium, iridium and mixtures thereof.

24. A fluid cracking catalyst comprising (a) a cracking component suitable for catalyzing the cracking of hydrocarbons, and (b) the composition of claim 1.

25. The cracking catalyst of claim 24 wherein said cracking catalyst comprises an admixture of components (a) and (b).

26. The cracking catalyst of claim 24 wherein said catalyst comprises integral particles which contain both components (a) and (b).

27. The cracking catalyst of claim 24 wherein component (b) comprises at least 0.01 wt % of the cracking catalyst.

* * * * *